United States Patent [19]

Matthews et al.

[11] Patent Number: 5,415,478
[45] Date of Patent: May 16, 1995

[54] ANNULAR BEARING COMPARTMENT

[75] Inventors: Anthony J. Matthews, Georgetown; Kenneth D. Parkman, Mississauga, both of Canada

[73] Assignee: Pratt & Whitney Canada, Inc., Longueuil, Canada

[21] Appl. No.: 243,884

[22] Filed: May 17, 1994

[51] Int. Cl.[6] .................................... F16C 37/00
[52] U.S. Cl. ............................ 384/476; 384/277
[58] Field of Search ............... 384/476, 277, 313, 321, 384/467, 557

[56] References Cited

U.S. PATENT DOCUMENTS

| | | | |
|---|---|---|---|
| 4,715,732 | 12/1987 | Sanders | 384/277 |
| 4,728,838 | 3/1988 | Mandel et al. | 384/476 |
| 5,207,512 | 5/1993 | Grant et al. | 384/476 |
| 5,358,338 | 10/1994 | Komiya | 384/476 |

Primary Examiner—Lenard A. Footland

[57] ABSTRACT

The present invention relates to a bearing compartment for a turbomachine such as a gas turbine engine. The compartment includes a bearing compartment, to which is attached, on its front and rear sides, covers that allow for the passage of air through the compartment as well as past the compartment. In particular, the compartment includes a plurality of axially extending and circumferentially spaced apart sealed air cavities surrounding an oil cavity in the compartment; the bearing which supports a shaft extending through the engine is supported by the bearing. The compartment also includes a plurality of axially extending and circumferentially buffer air cavities surrounding the sealed air cavities, thereby providing additional insulate protection to the oil cavity.

9 Claims, 4 Drawing Sheets 5,415,478

ANNULAR BEARING COMPARTMENT

TECHNICAL FIELD

This invention relates to gas turbine engines, and in particular, to an annular bearing compartment for gas turbine engines.

BACKGROUND OF THE INVENTION

Turbomachines such as gas turbine engines include a fan section, a compressor section, a combustion section, and a turbine section. A shaft extends axially through the engine from the fan section through the turbine section and rotates axially spaced apart stages of disks. Each disk carries circumferentially spaced apart blades that extend radially across a gas flowpath. The shaft is supported by one or more bearing assemblies. The bearing assemblies are connected to the case by a bearing support housing. The housing serves several purposes; it supports the bearing assemblies, it provides a closed environment for lubricating oil, and it retains the bearing assembly, and thereby retains the shaft in the event of a fan disk imbalance, or any other unexpected event.

While many designs for bearing housings have been proposed and used in the gas turbine engine, improved designs are required to provide optimum operating characteristics for advanced engines. The present invention satisfies this industry need.

SUMMARY OF THE INVENTION

According to this invention, an annular bearing compartment for supporting a shaft extending axially through a turbomachine comprises an annular bearing assembly coaxial with the shaft and an annular bearing housing surrounding the bearing assembly, wherein the bearing housing is comprised of walls that define an annular oil cavity and the bearing assembly includes a plurality of roller bearings located within the oil cavity, and wherein the bearing compartment including a first wall spaced from and in sealing relation to said bearing housing wall, and a second wall spaced from and in sealing relation to said first wall, wherein said first wall and said housing wall cooperate to define a first annular air cavity that surrounds said oil cavity; and said first and second walls cooperate to define a second annular air cavity that surrounds the first air cavity.

In a preferred embodiment of the invention, the bearing housing includes axially spaced apart front and rear walls, and the bearing compartment includes a front cover fixed to the front housing wall and a rear cover fixed to the rear housing wall, wherein each of the covers includes axially spaced apart inner and outer walls, wherein the inner wall of the front cover is spaced from, and in sealing contact with, the front wall of the housing such that the cover wall and housing define a front air cavity adjacent to the oil cavity; and the inner wall of the rear cover is spaced from and in sealing contact with the rear wall of the housing such that the cover and housing wall define a rear sealed air cavity adjacent to the oil cavity; and wherein the inner and outer walls of the front cover define a front buffer air cavity adjacent to the front sealed air cavity, and the inner and outer walls of the rear cover define a rear buffer air cavity adjacent to the rear seal air cavity. According to this preferred embodiment, the front and rear sealed air cavities are in fluid communication with each other by means of axially extending channels in the housing, wherein the channels extend from the front cover to the rear cover, and cooperate to define an axially extending sealed air cavity adjacent to the oil cavity which provides a dead air zone that insulates the air cavity from the hot gases of the bearing compartment. Additionally, the buffer air cavities are in fluid communication with each other by means of axially extending channels in the housing, wherein the buffer air channels extend from the front cover to the rear cover and cooperate to define an axially extending buffer air cavity adjacent to the sealed air cavity which provides additional thermal insulation to the bearing compartment. Other features and advantages of the present invention will be apparent from the figures and the description of the best mode for carrying out the invention as described below.

BEST MODE FOR CARRYING OUT THE INVENTION

Figure 1:
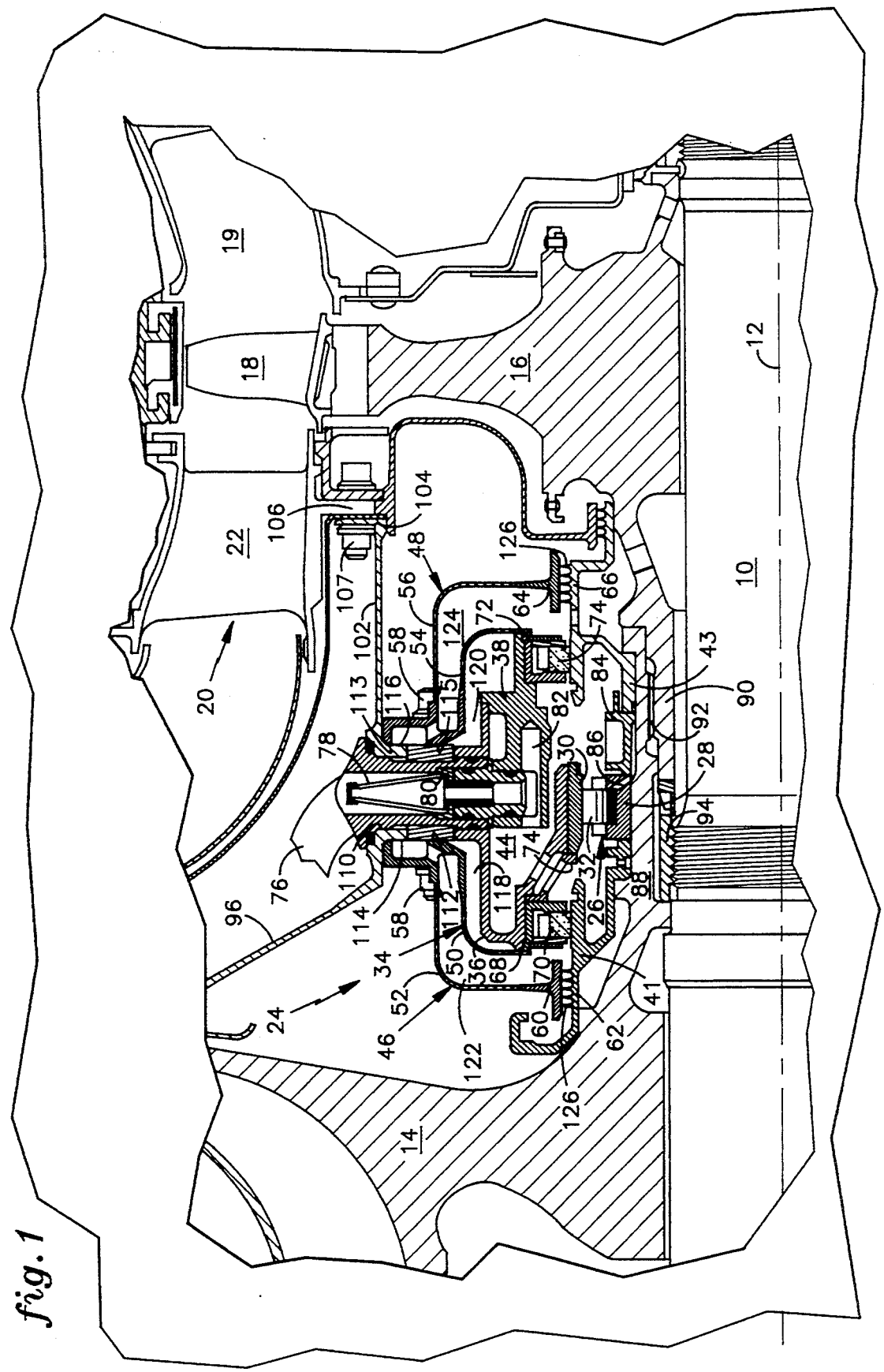
FIG. 1 is a cross sectional view showing the bearing compartment of the present invention.

FIG. 1 shows a shaft 10 extending in the downstream direction through a gas turbine engine, the shaft 10 having an axis of rotation 12. Rotationally attached to the shaft 10 are an impeller disk 14 and a turbine disk 16. At the outer periphery of the turbine disk 16 are a plurality of circumferentially spaced apart turbine blades 18 that extend across a flowpath 19 for working medium gases. Just upstream of the turbine disk 16 is a turbine stator 20 which is comprised of a row of circumferentially spaced apart and stationary turbine vanes 22. Axially between the impeller disk 14 and turbine disk 16 is a bearing compartment 24. The bearing compartment 24 is attached to the engine case in a manner to be described in more detail below, and supports the shaft 10 as it rotates during engine operation. The bearing compartment 24 is comprised of an annular bearing assembly 26 which is coaxial with the shaft 10. The bearing assembly 26 is comprised of an inner bearing race 28 which is rotationally fixed to the shaft 10, an outer bearing race 30 radially outwardly of the inner bearing race 28, and a plurality of circumferentially spaced apart roller bearings 32 spaced radially between the inner and outer bearing races 28, 30 respectively.

A bearing housing 34 surrounds the bearing assembly 26. The bearing housing 34 includes front and rear walls, 36 and 38, respectively, that cooperate to define an annular oil cavity 44. The bearing assembly 26 is constructed and arranged such that the roller bearings 32 are located within the oil cavity 44.

The bearing compartment 24 also includes a front cover 46 fixed to the front wall 36 of the bearing housing 34, and a rear cover 48 fixed to the rear wall 38 of the bearing housing 34. The front cover 46 is comprised of axially spaced apart inner and outer walls 50 and 52, respectively. Likewise, the rear cover 48 is comprised of axially spaced apart inner and outer walls 54 and 56, respectively. The front and rear covers 46 and 48 are attached to the bearing housing 34 by circumferentially spaced apart bolts 58 or the like that pass through bolt holes (not shown) in the covers 46 and 48, as described in more detail below.

As shown in FIG. 1, the outer wall 52 of the front cover 46 includes a land 60 which contacts lenticular-type knife edge seal 62 on front seal runner 41. Likewise, the outer wall 56 of the rear cover 48 includes a land 64 which contacts lenticular-type knife edge seal 66 on the rear seal runner 43. The inner wall 50 of the front cover 46 contacts the housing 68 of carbon seal 70; similarly, the inner wall 54 of rear cover 48 contacts the housing 72 of carbon seal 74. Each carbon seal 70, 74 rests upon its respective seal runner 41, 43. Extending between the front carbon seal race 68 and the outer roller bearing race 30 is an axial stop 74 which positions the races 68, 30 relative to each other.

The bearing housing 34 includes a port 76 for oil to enter the oil cavity 44, and a port (not shown) for oil to exit the cavity 44. The housing 34 also includes an oil filter 78 adjacent to the port 76. The filter 78 is positioned within the housing 34 by brackets 80 or similar such devices. The housing 34 also includes an oil channel 82 which, during engine operation, sprays oil at an oil scoop 84. The oil scoop 84 delivers oil to the roller bearings 32 by means of passageway 86 in the inner bearing race 28.

The impeller 14 includes an axially extending land 88 which rests upon the shaft 10. The turbine disk 16 also includes an axially extending land 90 which is rotationally fixed to the impeller land 88 by means of spline 92. The impeller 14 is axially fixed to the shaft 10 by a nut 94 which is threaded onto the shaft 10. The nut 94 is locked onto the shaft 10 by a dog and slot construction to prevent the shaft from loosening during engine operation.

Figure 2:
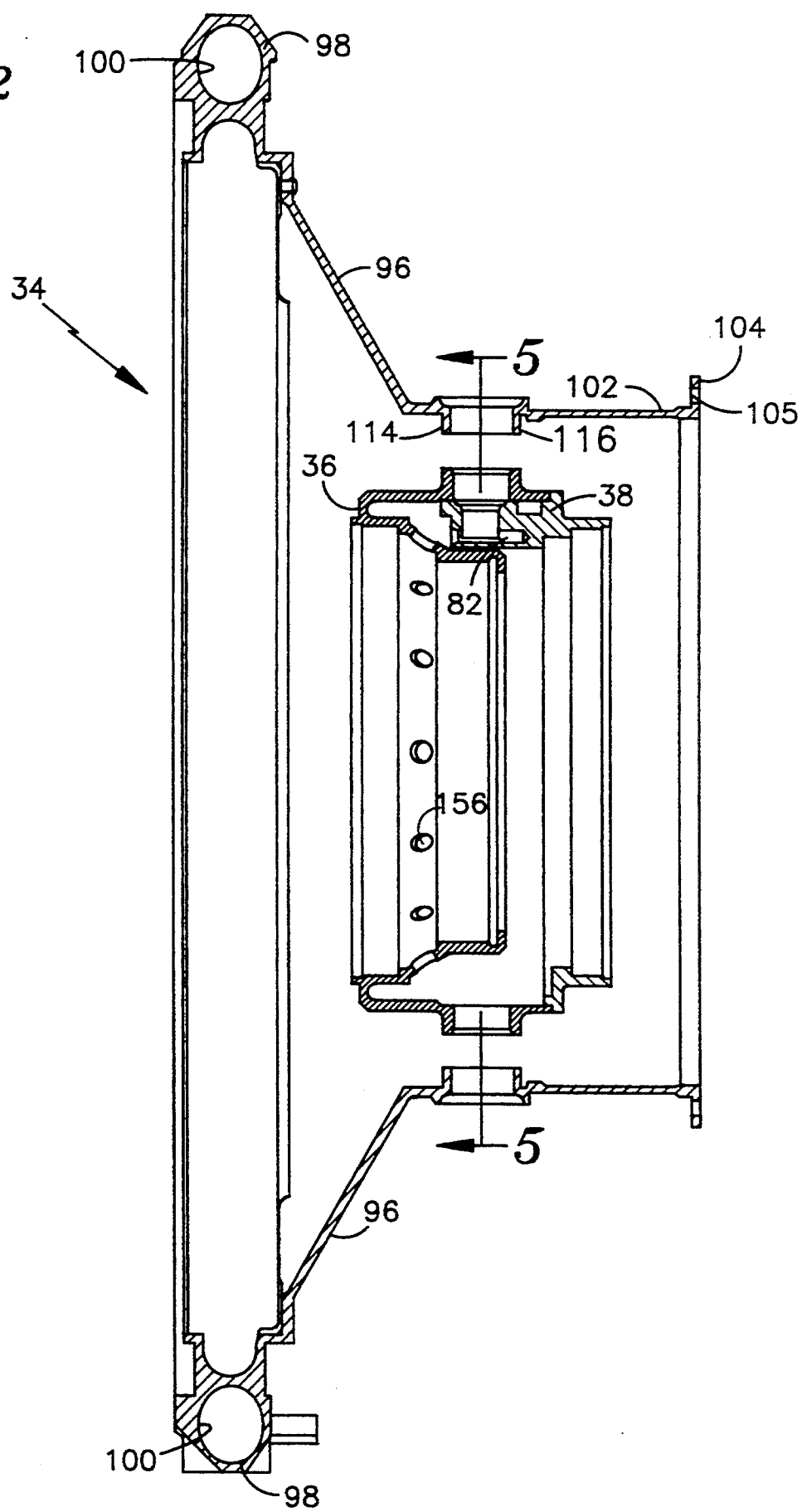
FIG. 2 is a cross sectional view showing the bearing housing of the present invention.

FIG. 2 shows additional features of the bearing housing 34. The forward portion of the housing 34 includes radially outwardly extending walls 96 which terminate at diffuser housing 98. The diffuser housing 98 is integral with the bearing housing 34 and includes bolt holes 100 for bolts or the like that attach the bearing housing 34 and its integral diffuser housing 98 to the engine case or other support structure. The rear portion of the housing 34 includes a cylindrical portion that is coaxial with the shaft, and is defined by axially extending wall 102 which terminates with a radially outwardly extending flange 104. As is also seen in FIG. 1, the flange 104 includes a plurality of circumferentially spaced apart bolt holes 105 for receiving bolts 107 or similar attachments to secure the housing 34 to the turbine stator 22.

Figure 3:
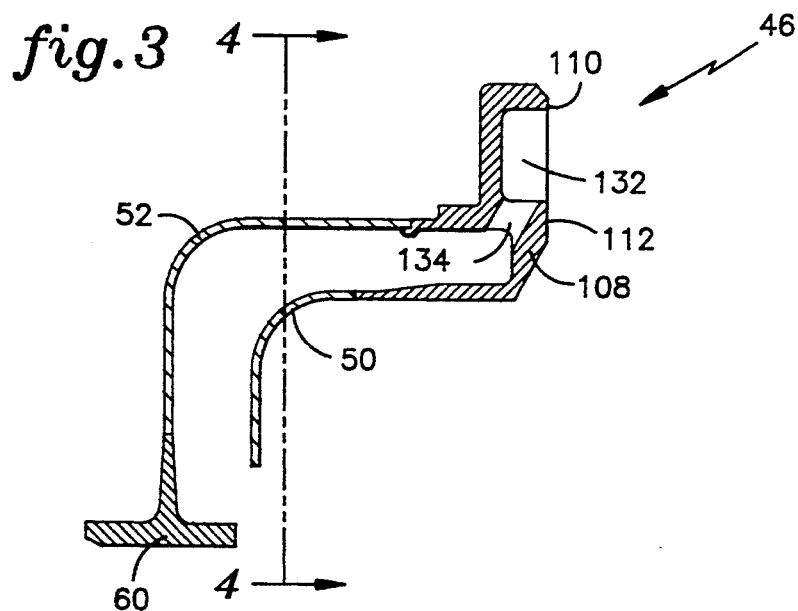
FIG. 3 is a cross sectional view showing the front cover used in the bearing compartment of the present invention.

FIG. 3 shows the front cover 46 of the bearing housing 34 in more detail. (While FIG. 3 shows only the front cover 46, it should be understood that the rear cover 48 is similarly configured.) The inner and outer walls 50 and 52 are integral with the body 108 of the cover 46. The body 108 includes axially facing surfaces 110, 112 and scooped-out portion 132 therebetween. When the front cover 46 is assembled to the bearing housing 34 as shown in FIG. 1, the cover surfaces 110, 112 sealingly abut the axially facing surface 114 on the housing 34; similarly, the surfaces 113, 115 on the rear cover 48 sealingly abut their corresponding axially facing surface 116 on the housing 34. Additionally, and as indicated above, the inner walls 50, 54 of the covers 46, 48, respectively, sealingly abut the races 68, 72 of seals 70, 74, respectively. Finally, the lands 60, 64 of the covers 46, 48, respectively, abut the knife edges 62, 66 on the seal runners 41, 43, respectively. As a result of the aforementioned construction, sealed air cavities are formed between the inner walls 50, 54 and the bearing housing 34, and buffer air cavities are formed between the inner walls 50, 54 and the outer walls 52, 56 of the covers.

Figure 4:
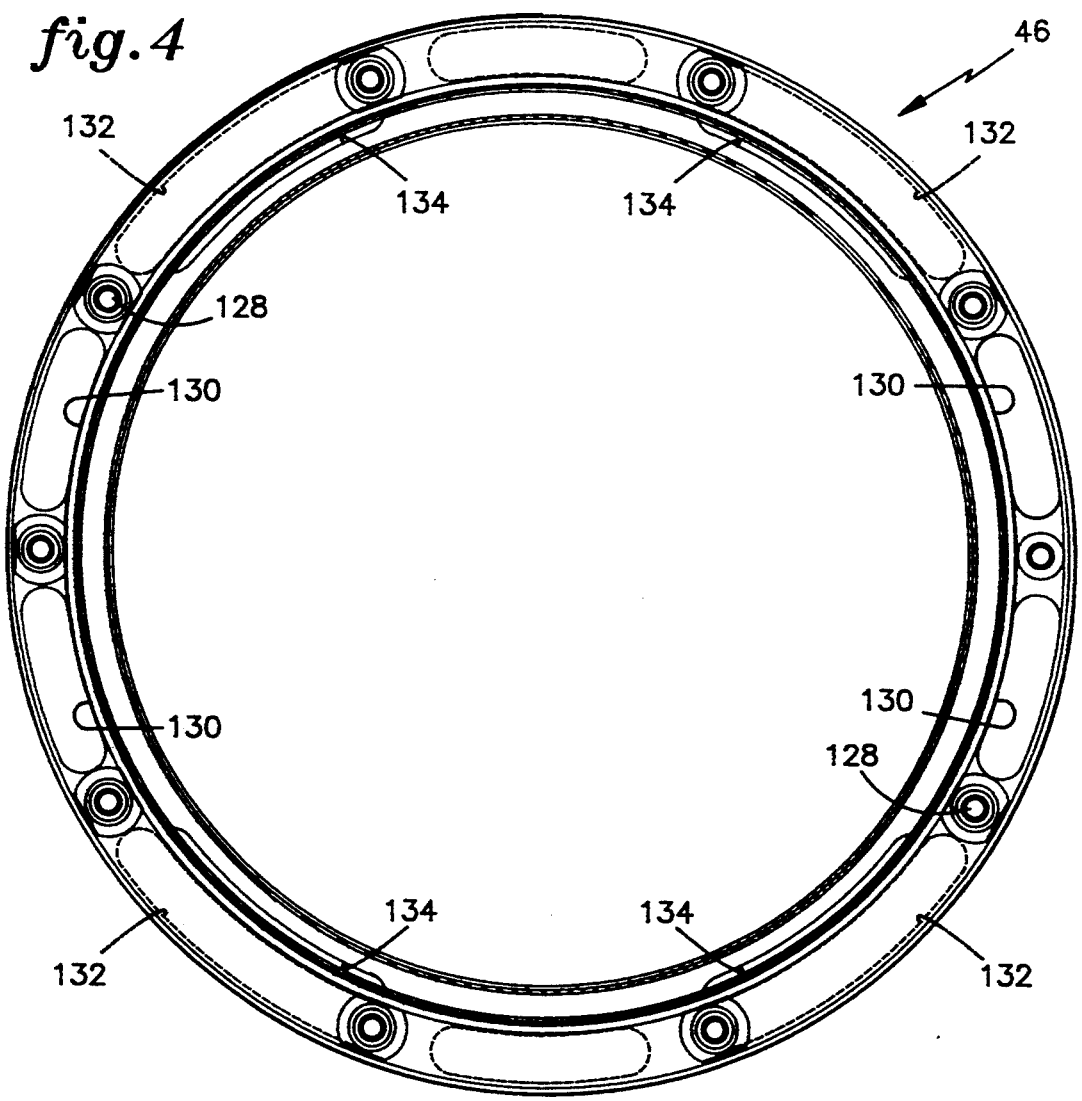
FIG. 4 is a cross section taken along the lines 4—4 of FIG. 3.
Figure 5:
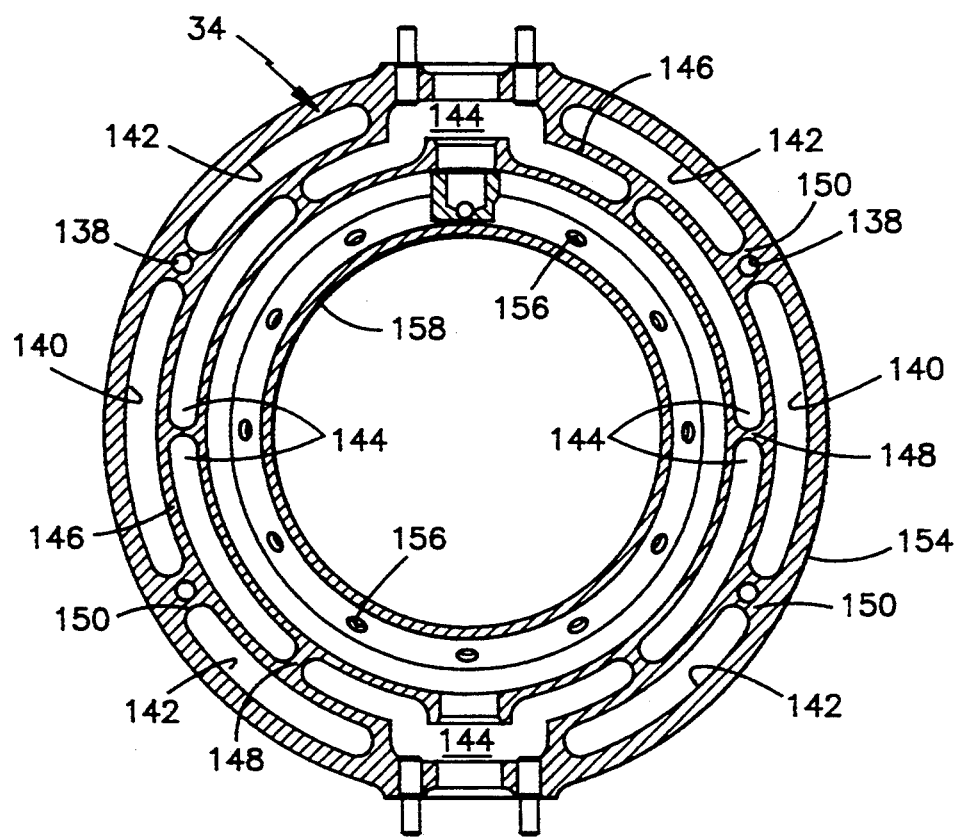
FIG. 5 is a cross sectional view taken along the lines 5—5 of FIG. 2.

More specifically, and referring additionally to FIGS. 1, 4 and 5, the inner wall 50 of the front cover 46 and the bearing housing 34 cooperate to create a front sealed air cavity 118; likewise, the inner wall 54 of the rear cover 48 and the housing 34 create a rear sealed air cavity 120. The air cavities 118 and 120 extend from the front side to the rear side of the bearing compartment 24, surrounding and adjacent to the oil cavity 44; they provide an insulating zone of dead air adjacent to the oil cavity 44 that minimizes the effects of the hot gases produced during engine operation on the temperature of the oil within the cavity 44.

The inner and outer walls 50, 52 of the front cover 46, and the inner and outer walls 54, 56 of the rear cover 48, cooperate to form buffer air cavities 122, 124, respectively. The front buffer air cavity 122 is formed by the outer wall 52 and its land 60 in contact with knife edge seal 62, in combination with the inner wall 50 in contact with the seal housing 68. Similarly, the rear buffer air cavity 124 is formed by the outer wall 56 and its land 64 in contact with knife edge seal 66, in combination with the inner wall 54 in contact with the seal housing 72. The walls 50, 52 and 54, 56 that define the buffer air cavities 122 and 124, respectively, reduce the amount of air that would otherwise leak past the carbon seals 70, 74 and into the oil cavity 44 during engine operation. Such reduction of air leakage is important as the service life of the engine increases, because the seals 70, 74 wear during use. The buffer air cavities, in their role of limiting leakage of air into the oil cavity 44, ultimately function to keep the oil temperature within its predicted design levels. As a result, the size of the oil cooler used to extract heat from the oil can be kept small, thereby reducing cost and engine weight, both of which are desirable.

As seen in FIG. 4, the front cover 46 includes circumferentially spaced apart holes 128 for attaching the cover 46 to the housing 34 by bolts 58 or the like. The cover 46 also includes a plurality of circumferentially spaced apart elliptical channels 130 that permit air to flow from the upstream side of the bearing compartment 24 to the downstream side of the bearing compartment 24 during engine operation. These channels 130 are described in more detail below. The cover 46 additionally includes circumferentially spaced apart elliptical channels 132. The channels 132 allow for fluid communication between buffer air cavities 122 and 124. As shown in FIG. 3, and with respect to the front cover 46, the front buffer air cavity 122 communicates with the channels 132 by means of passageways 134 that extend radially outwardly through the body 108 of cover 46. The cover 46 includes one passageway 134 for each channel 132. As shown in FIG. 4, the circumferential extent of each of the passageways 134 is slightly less than the circumferential extent of its corresponding channel 132. (As indicated above, the rear cover 48 is configured in a like manner to the from cover 46, and accordingly, includes the same set of channels and passageways as shown in FIG. 3.)

FIG. 5 provides additional details concerning how the front sealed air cavity 118 communicates with the rear sealed air cavity 120, and how the front buffer air cavity 122 communicates with the rear buffer air cavity 124. Additionally, it indicates how air is able to flow through the air channels 130 on the upstream side of the bearing compartment 24 to the downstream side of the bearing compartment 24. In particular, FIG. 5 is a section along the lines 5—5 of FIG. 2. The housing 34 includes a plurality of bolt holes 138 through which bolts 58 extend and attach the front cover 46, the housing 34 and rear cover 48 together. A plurality of circumferentially spaced apart elliptical channels are present in the housing 34, as shown. More specifically, a first set of elliptical channels 140 are spaced about the outer periphery 154 of the housing 34 and allow air to flow, initially, through the channels 130 in the front cover 46 (see FIG. 4), then through the channels 140 in the housing 34, and finally, through channels in the rear cover 48. The channels 130 and 140 therefore cooperate to define a plurality of circumferentially spaced apart, axially extending and elliptically shaped conduits that allow the hot gases produced during engine operation to flow in the downstream direction past the bearing compartment 24.

FIG. 5 also shows a second set of elliptical channels 142 circumferentially spaced about the periphery 154 of the housing 34. The channels 142 in the housing 34 are spatially aligned with the channels 132 in the covers 46, 48. The second set of channels 142 allow buffer air to flow from the front buffer air cavity 122, through the recesses 134 in the body 108 of the front cover 46 (see FIG. 3), into the buffer air channels 132 in the front cover 46, through the buffer air channels 142 in the bearing housing 34, into the recesses 134 and channels 142 in the rear cover 48, and finally, into the buffer air channel 124 in the rear cover 48. As a result, air in the front buffer air cavity 122 is in fluid communication with air in the rear buffer air cavity 124. The cavities 122, 124, in combination with the channels 132 and 142, and the recesses 134, cooperate to define a singular chamber for buffer air that extends axially through the bearing compartment. The chamber has an annular shape, and extends from the front of the bearing compartment 24 to the rear of the compartment 24, and surrounds the oil cavity to provide thermal insulation thereto.

As is also shown in FIG. 5, spaced radially inward of the channels 140 and 142 are a plurality of circumferentially spaced apart channels 144. The channels 144 link the front sealed air cavity 118 with the rear sealed air cavity 120, and allow for fluid communication therebetween. As a result, the channels 144 and cavities 118, 120 cooperate to define a singular sealed cavity of air that extends axially through the bearing compartment. The sealed cavity is annular in shape, and is surrounded, in both radial and axial directions, by the singular buffer air chamber.

The radially inner channels 144 are separated from the other channels 140 and 142 in the wall 36 by thin, circumferentially extending ribs 146 and radially extending ribs The channels 140 and 142 are separated from each other by radially extending ribs 150. The thin circumferentially and radially extending ribs 146, 148, 150 allow the housing 34 to flex during engine operation. In particular, during engine operation, the temperature of the housing is highest at the outer periphery 154 of the housing 34, and lowest at the radially innermost surface 152 of the housing. The thermal fight which takes place between the inner and outer surfaces 152, 154, respectively is taken up by the system of radial and circumferential ribs 146, 148, 150 in the housing 34. Oil drain holes 156 are provided near the inner periphery 158 of the wall 36.

The bearing compartment of the present invention solves a complicated problem that designers of modern gas turbine engines have long straggled with, namely, how to combine, into a very small one-piece structure, all of the functions of a complex secondary air system and a thermally stable bearing support structure that has the correct stiffness and flexibility to satisfy rotor dynamic requirements. This problem is solved by the inventive system of air cavities and communicating passageways that shield the bearing assembly 26 from the wide range of air temperatures that are encountered during engine operation, and also provide a buffer sealing system that minimizes the amount of air that leaks past the carbon seals and into the oil cavity during engine operation. The bearing compartment of this invention also plays an important role in protecting the oil cavity when the carbon seals wear or become damaged during engine operation; the buffer air cavities ultimately minimize the size of the engine oil cooler which is necessary to extract heat from the engine oil, thereby saving both cost and weight of the engine.

Although the invention has been shown and described with respect with exemplary embodiments thereof, it should be understood by those skilled in the art that various changes, omissions, and additions may be made thereto, without departing from the spirit and scope of the invention.

We claim:

1. An annular bearing compartment for a turbomachine that includes a shaft extending axially through the machine, wherein said bearing compartment supports the shaft and is comprised of:

an annular bearing assembly coaxial with the shaft, wherein said bearing assembly is comprised of an inner bearing race rotationally fixed to the shaft, an outer bearing race spaced radially outwardly of said inner bearing race, and a plurality of circumferentially spaced apart roller bearings between said inner and outer bearing races;

an annular bearing housing surrounding said bearing assembly, wherein said bearing housing includes an annular oil cavity, and said bearing assembly is constructed and arranged such that the roller bearings are located within the oil cavity;

a first wall spaced from and in sealing relation to said bearing housing, wherein said wall and housing cooperate to define a first annular air cavity that surrounds said oil cavity;

a second wall spaced from and in sealing relation to said first wall, wherein said first and second walls cooperate to define a second annular air cavity that surrounds the first air cavity.

2. An annular bearing compartment for a turbomachine that includes a shaft extending axially through the machine, wherein said bearing compartment supports the shaft and is comprised of:

an annular bearing assembly coaxial with the shaft, wherein said bearing assembly is comprised of an inner bearing race rotationally fixed to the shaft, an outer bearing race spaced radially outwardly of said inner bearing race, and a plurality of circumferentially spaced apart roller bearings between said inner and outer bearing races;

an annular bearing housing surrounding said bearing assembly, wherein said bearing housing is comprised of axially facing front and rear walls that cooperate to define an annular oil cavity, and said bearing assembly is constructed and arranged such that the roller bearings are located within the oil cavity;

a front cover fixed to the front wall of said bearing housing and a rear cover fixed to the rear wall of said bearing housing, wherein each of said covers is comprised of spaced apart inner and outer walls; wherein the inner wall of said front cover is spaced from and in sealing contact with the front wall of the housing and define a front sealed air cavity adjacent to the oil cavity; and wherein the inner wall of said rear cover is spaced from and in sealing contact with the rear wall of the housing and define a rear sealed air cavity adjacent to the oil cavity;

and wherein the inner and outer walls of the front cover define a front buffer air cavity adjacent to the from sealed air cavity; and the inner and outer walls of the rear cover define a rear buffer air cavity adjacent to the rear sealed air cavity.

3. The bearing compartment of claim 2, wherein said front and rear sealed air cavities are in fluid communication with each other by means of axially extending channels, such channels extending from the front cover to the rear cover, wherein said channels and cover walls cooperate to define an annular, axially extending sealed air cavity adjacent to the oil cavity; and wherein said buffer air cavities are in fluid communication with each other by means of axially extending buffer air channels, said buffer air channels extending from the front cover to the rear cover, wherein said buffer air channels and cover walls cooperate to define an annular, axially extending buffer air cavity adjacent to the sealed air cavity.

4. The bearing compartment of claim 2, wherein said axially extending channels that provide fluid communication between said front and rear sealed air cavities are comprised of a plurality of front and rear sealed air cavities that are elliptically shaped and circumferentially spaced apart in said housing.

5. The bearing compartment of claim 2, wherein said axially extending channels that provide fluid communication between said front and rear buffer air channels are comprised of a plurality of front and rear sealed air cavities are elliptically shaped and are circumferentially spaced apart in said housing.

6. The bearing compartment of claim 2, wherein said axially extending channels that provide fluid communication between said front and rear sealed air cavities are comprised of a plurality of front and rear sealed air cavities that are elliptically shaped and circumferentially spaced apart in said housing, and wherein said axially extending channels that provide fluid communication between said front and rear buffer air channels are comprised of a plurality of front and rear buffer air cavities that are elliptically shaped and circumferentially spaced apart in said housing.

7. The bearing compartment of claim 6, wherein said sealed air cavity channels are radially inward of said buffer air cavity channels.

8. The bearing compartment of claim 2, wherein said front and rear covers each include a plurality of channels therein, and said bearing housing includes a plurality of channels therein, wherein the channels in said covers and housing cooperate to define a plurality of conduits that allow gases to flow through past the bearing compartment.

9. An annular bearing compartment for a turbomachine that includes a shaft extending axially through the machine, wherein said bearing compartment supports the shaft and is comprised of:

an annular bearing assembly coaxial with the shaft, wherein said bearing assembly is comprised of an inner bearing race rotationally fixed to the shaft, an outer bearing race spaced radially outwardly of said inner bearing race, and a plurality of circumferentially spaced apart roller bearings between said inner and outer bearing races;

an annular bearing housing surrounding said bearing assembly, wherein said bearing housing is comprised of axially facing front and rear walls that cooperate to define an annular oil cavity, and said bearing assembly is constructed and arranged such that the roller bearings are located within the oil cavity;

a front cover fixed to the front wall of said bearing housing and a rear cover fixed to the rear wall of said bearing housing, wherein each of said covers is comprised of spaced apart inner and outer walls; wherein the inner wall of said front cover is spaced from and in sealing contact with the front wall of the housing and define a front sealed air cavity adjacent to the oil cavity; and wherein the inner wall of said rear cover is spaced from and in sealing contact with the rear wall of the housing and define a rear sealed air cavity adjacent to the oil cavity; and wherein said front and rear sealed air cavities are in fluid communication with each other by means of circumferentially spaced apart elliptical channels extending axially from the front cover to the rear cover to define an annular, axially extending sealed air cavity adjacent to the oil cavity;

and wherein the inner and outer walls of the front cover define a front buffer air cavity adjacent to the front sealed air cavity; and the inner and outer walls of the rear cover define a rear buffer air cavity adjacent to the rear sealed air cavity; and wherein said buffer air cavities are in fluid communication with each other by means of circumferentially spaced apart elliptical channels extending axially from the front cover to the rear cover to define an annular, axially extending buffer air cavity adjacent to the sealed air cavity.

* * * * *

UNITED STATES PATENT AND TRADEMARK OFFICE
CERTIFICATE OF CORRECTION

PATENT NO. : 5,415,478

DATED : May 16, 1995

INVENTOR(S) : Anthony Matthews et al.

It is certified that error appears in the above-indentified patent and that said Letters Patent is hereby corrected as shown below:

claim 2, column 7, line 21, delete "from" and insert --front--

Signed and Sealed this

Twentieth Day of February, 1996

Attest:

BRUCE LEHMAN

*Attesting Officer*  *Commissioner of Patents and Trademarks*